April 7, 1936.  C. U. BUNDICK ET AL  2,036,918
CINEMATOGRAPHIC APPARATUS
Filed April 26, 1930   4 Sheets-Sheet 1
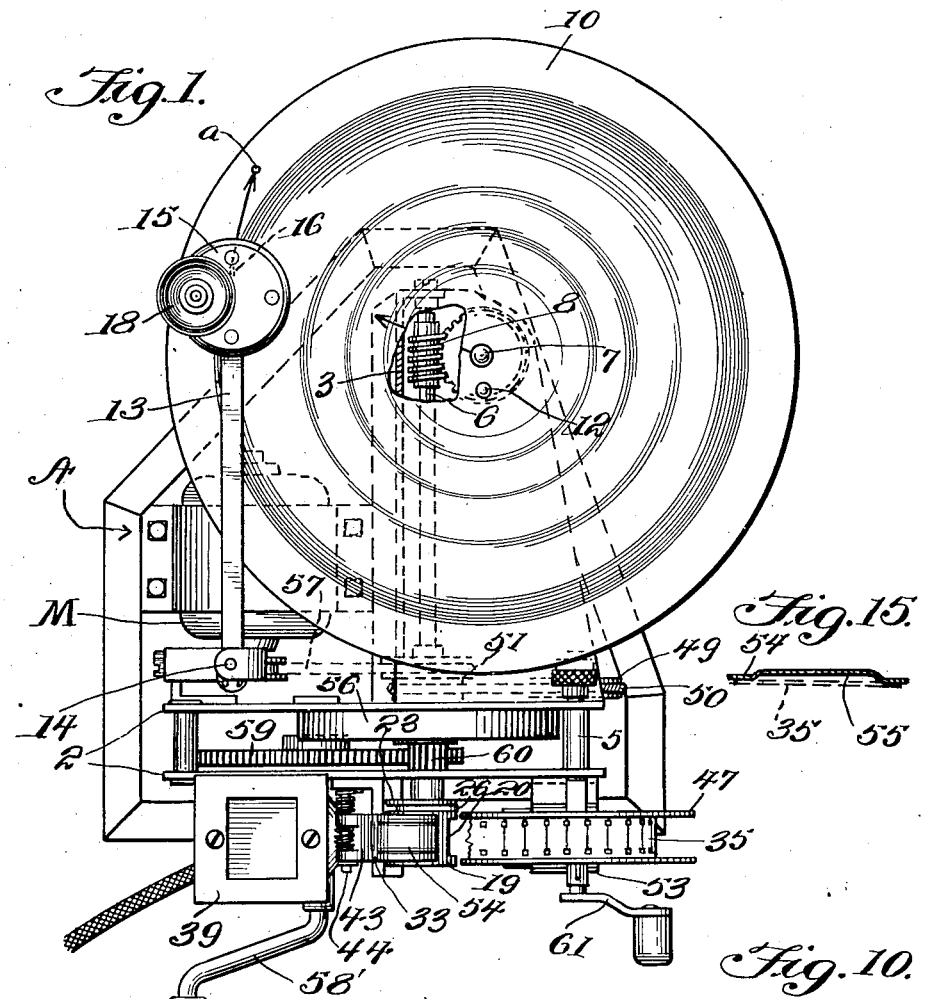
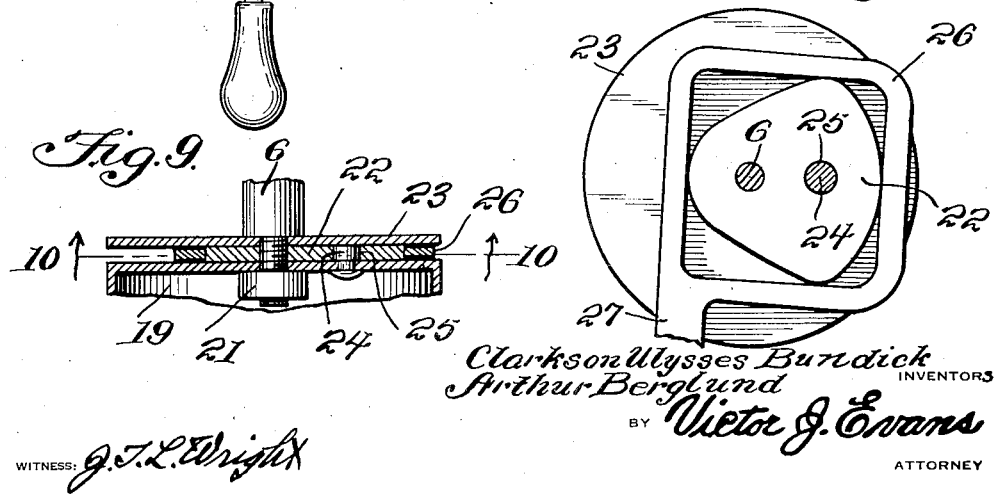

April 7, 1936.　　　C. U. BUNDICK ET AL　　　2,036,918
CINEMATOGRAPHIC APPARATUS
Filed April 26, 1930　　　4 Sheets-Sheet 2
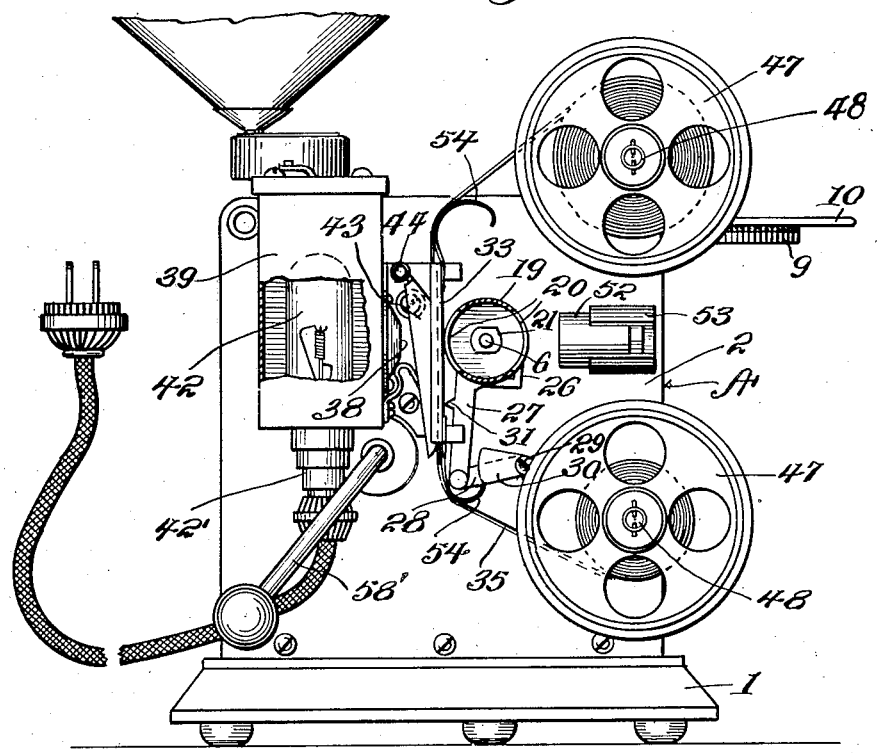
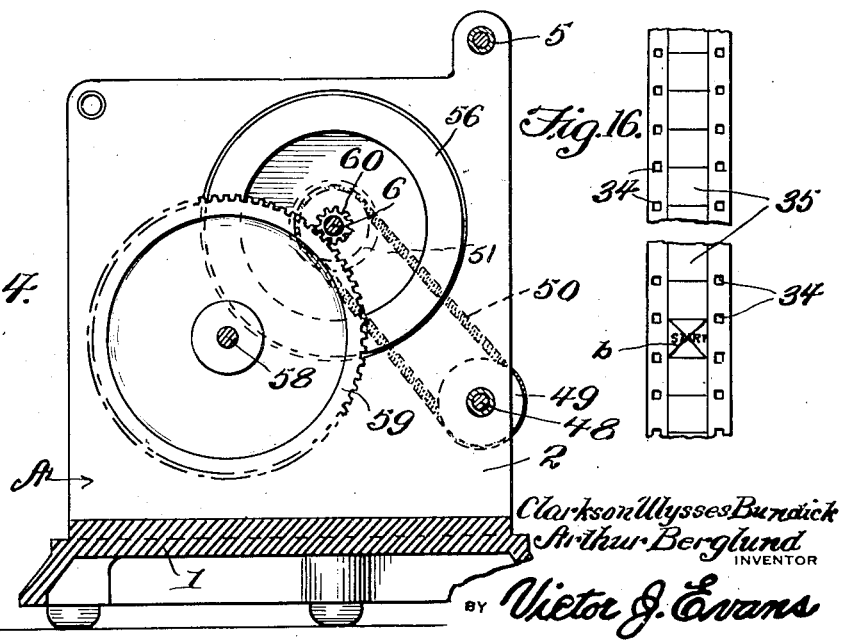

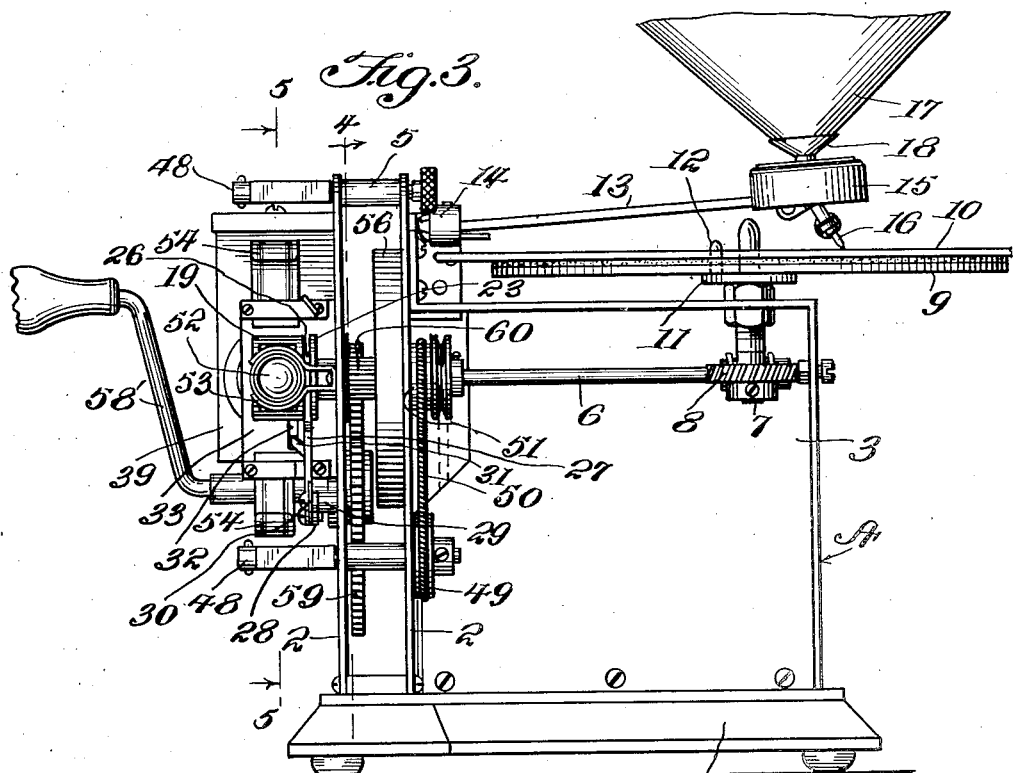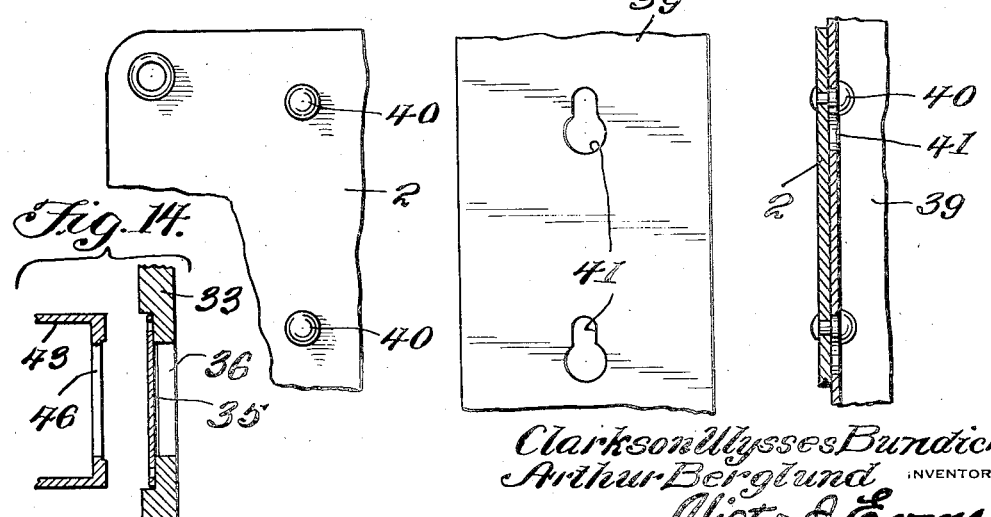

April 7, 1936. C. U. BUNDICK ET AL 2,036,918
CINEMATOGRAPHIC APPARATUS
Filed April 26, 1930 4 Sheets-Sheet 4
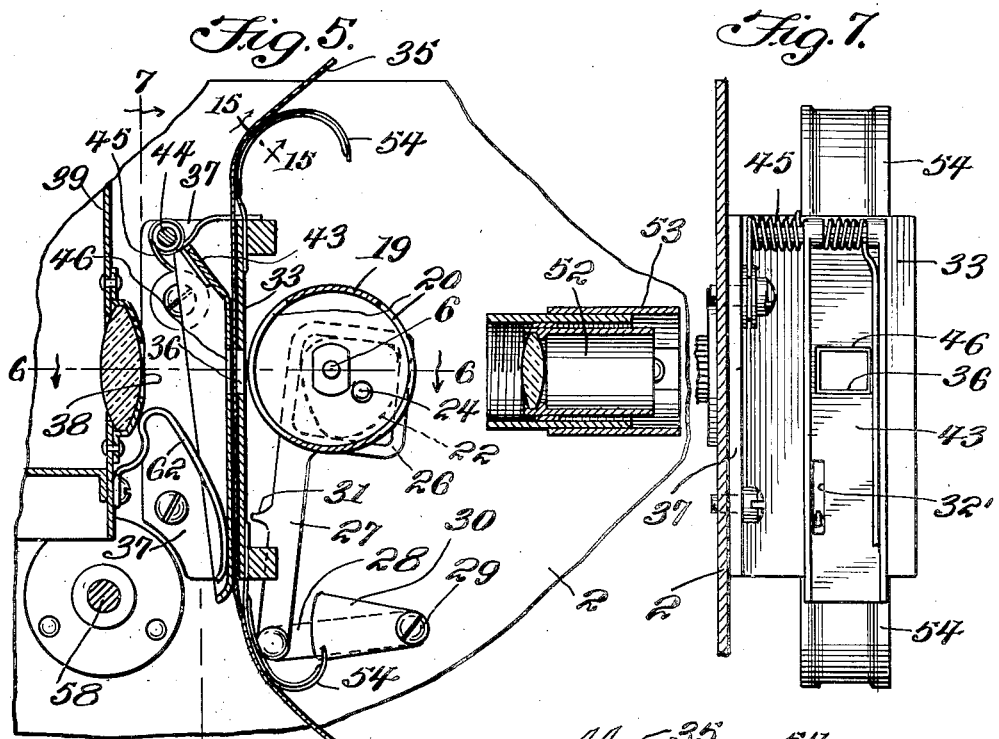
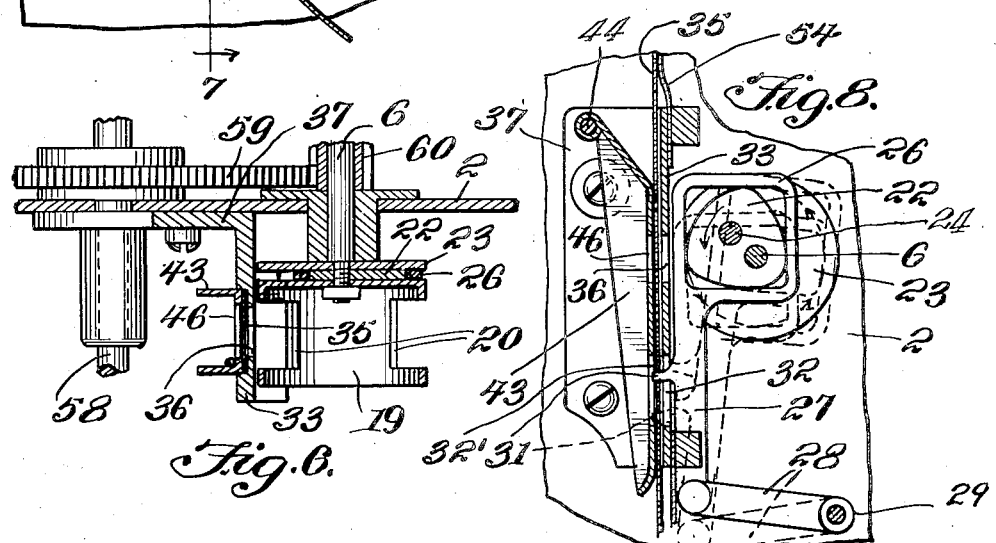
Clarkson Ulysses Bundick
Arthur Berglund INVENTOR
BY Victor J. Evans
ATTORNEY
WITNESS: J. L. Wright Patented Apr. 7, 1936

2,036,918

UNITED STATES PATENT OFFICE 2,036,918

CINEMATOGRAPHIC APPARATUS

Clarkson U. Bundick, White Plains, and Arthur Berglund, Dobbs Ferry, N. Y., assignors, by mesne assignments, to Kinatome Patents Corporation, Ridgewood, N. J., a corporation of New York Application April 26, 1930, Serial No. 447,668

16 Claims. (Cl. 88—17)

This invention relates to a combined projector and talking machine, the general object of the invention being to so construct and arrange the parts that the device can be manufactured to sell at low cost and is so simple that it can be operated by a child, with means for operating the shutter, the film feeding means and the turntable of the talking machine from a single shaft so that the sound is synchronized with pictures.

Another object of the invention is to provide means for so rotating one of the film reels from the shaft that the reel will cease to move when the film is not being moved by its feeding device, with spring members engaging the film above and below the film gate, which act as shock absorbers and prevent a strain being placed upon the film and also compensate for the difference of the character of movement of the continuously driven reels and the intermittent feed ng member disposed therebetween.

A further object is to provide a cinematographic apparatus without feed or take-up sprockets, substituting therefor springs adapted to engage the film above and below the film gate and act as compensating members or shock absorbers. By eliminating the conventional continuously driven sprockets, the necessary gear train for driving same is also eliminated, thereby cutting down the mechanism to one shaft which serves the double purpose of rotating the shutter and moving the film in step by step relation thereto. This makes it possible to make a mechanism of this kind at a very low cost. It is obvious that the arrangement of shock absorber or compensating springs and the special construction of the film gate described herein may be employed in connection with a camera, a film printer, or any other cinematographic device in which the film is to be moved intermittently therethrough and therefore the appended claims covering these features of the invention are not necessarily limited to a projector combined with a talking machine.

A still further object is to provide a talking moving picture apparatus of compact form, light in weight, and portable.

This invention also consists in certain other features of construction generally applicable to cinematographic apparatus such as cameras, projectors, film printers and the like, and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, showing for the sake of illustration a projector and talking machine and in which:—

Figure 1 is a top plan view of the device, with certain parts in section and certain parts broken away.

Figure 2 is a side view, with certain parts broken away and certain parts shown in section.

Figure 3 is a front elevational view of the device.

Figure 4 is a section on line 4—4 of Figure 3.

Figure 5 is a section on line 5—5 of Figure 3, certain parts being omitted for clarity.

Figure 6 is a section on line 6—6 of Figure 5.

Figure 7 is a section on line 7—7 of Figure 5.

Figure 8 is a detail view showing the operation of the film feeding means by the cam.

Figure 9 is a detail sectional view showing how the cam is rotated with the shutter.

Figure 10 is a section on line 10—10 of Figure 9.

Figure 11 is a detail view showing the studs for supporting the lamp housing from the front plate of the frame of the device.

Figure 12 is a detail view showing the stud receiving openings in the lamp housing.

Figure 13 is a sectional detail view showing how the studs engage the openings to detachably connect the lamp housing with the frame.

Figure 14 is a section taken through the open gate.

Figure 15 is a sectional view through one of the spring members, the section being taken on line 15—15 of Figure 5.

Figure 16 is a view of part of the film.

In these drawings, the letter A indicates the frame of the device which is composed of the base 1, the spaced plates 2 connected at their lower ends with the front of the base and the housing 3 connected with the base and with the rear plate 2. The plates 2 are separated by the spacers 5. A horizontal shaft 6 is journaled in the frame and passes through the two plates 2, with a part of the shaft in the housing 3. A vertically arranged shaft 7 is journaled in the top of the housing and worm gearing 8 connects the shafts 6 and 7, the upper end of the shaft 7 being adapted to pass through the turntable 9 and the record disk 10. A circular part 11 is fastened to the upper part of the shaft and forms a support for the turntable. This circular part carries an upright pin 12 which also passes through a hole in the turntable and a hole in the record disk. This pin 12 acts as a positive means for connecting the record disk with the turntable and eliminates danger of the record disk slipping on the turntable.

An arm 13 is swiveled to a part of the frame, as shown at 14, and the free end of the arm carries a reproducer 15, a stylus 16 of which engages a record disk. A horn 17 is supported from the reproducer by a member 18. A barrel shutter 19, made in the form of a cylinder with opposing openings 20 in its sides, is fastened to the front end of the shaft 6 by a nut 21 which engages the reduced threaded end of the shaft. A cam 22 is placed between the shutter and a disk 23, the disk and cam having openings therein through which the reduced end of the shaft passes. A pin 24 in the shutter engages a hole 25 in the cam so that the cam must be placed in a certain position relative to the shutter before the parts can be assembled. The pin will hold the parts in this relation. A rectangular cam follower part 26 formed on the upper end of an arm 27 fits over the cam and is held between the shutter and the disk 23. The lower end of the arm 27 is pivoted to a short arm 28 which is pivoted to the front plate 2, as shown at 29. A spring plate 30 may be held by the pivot 29 and may press against the arm 28 to exert slight pressure on the arm. The arm 27 is formed with a projecting tooth 31 which operates through a slot 32 in a fixed film gate section 33 to engage perforations 34 in the film 35 to give the film a step by step movement in the usual manner as the arm 27 is being operated by the cam. As will be seen, the arm 27 is given a combined reciprocatory and oscillatory movement by the cam so that it will be moved upwardly and then outwardly or toward the film gate section 33 so that its tooth 31 will pass through the slot 32 and engage perforations 34 in the film and then the arm is moved downwardly to move the film, after which the arm moves outwardly and upwardly while the film is stationary and then the arm is moved inwardly to again place the tooth in engagement with the next perforation in the film thereby carrying out the intermittent feeding operation. The fixed gate section 33 is formed with a usual aperture 36 and has a flange 37 which is fastened to the front plate 2 with the aperture 36 in alignment with a condensing lens 38 of the lamp housing 39 which is detachably supported on the front plate 2 by studs 40 carried by the front plate engaging keyhole shaped slots 41 in the housing. This housing carries a usual lamp 42 mounted in a socket 42'.

A door or pressure plate or movable gate section 43 is hingedly connected with the flange 37, as shown at 44, and a spring 45 acts to hold the door against the fixed film gate section 33, said door being provided with an aperture 46 which registers with the aperture 36, and with a slot 32' which registers with the slot 32.

Delivery and taking up reels 47 for the film are carried by shafts 48 which pass through upper and lower spacers 5, the lower shaft having a pulley 49 attached thereto over which a spring belt 50 passes, this belt also passing over a pulley 51 on the shaft 6. The film passes between the fixed and movable gate sections 33 and 43 respectively. The movable gate section is pressed against the film by a spring 45. The fixed film gate section 33 is channeled to receive the film. The film gate is so formed that only the edges of the film contact the parts so that there is no danger of scratching the face of the film. This arrangement is shown in Figure 14.

A usual objective lens 52 is carried by a tubular lens support 53 which is fastened to the front plate. This objective lens is, of course, in alignment with the apertures in the fixed gate section 33 and the movable gate section 43. Curved spring members 54 are attached to the ends of the film gate and contact the film between the film gate and the reels and act as shock absorbers or tensioning members for the film, as said members will give if any undue tension is exerted on the film above and below the film gate and will also compensate for the difference in character of movement between the continously moving reels 47 and the intermittently moving finger 31 as taught in the co-pending application of the applicants Bundick and Proctor, Serial Number 44,482, filed July 18, 1925, now Patent Number 1,944,022, dated July 16, 1934. Each compensating member is also slightly channeled, as shown at 55 in Figure 15, so that only the edges of the film contact the member. The shaft 6 is provided with a fly wheel 56 which is located between the two plates 2. The shaft may either be driven from a motor M which is belted to the shaft, as shown at 57, or the shaft may be driven manually through means of the shaft 58 journaled in the frame and provided with a gear 59 which meshes with a pinion 60 on the shaft. The shaft 58 may be driven by a handle 58'.

From the foregoing it will be seen that the rotary movement of the shaft 6 is imparted to the turntable and the record disk thereon so that the talking part of the apparatus is operated from the shaft and said shaft also rotates the shutter to cause the same to control the light rays passing from the lamp housing through the film to the lens 52 and said shaft also operates the cam which operates the feeding means for the film in timed relation to the shutter 19. Thus both the talking part and the projecting part of the apparatus are operated from the one shaft so that the sound will be synchronized with the pictures, as the apparatus is started with the film and the record at set marks.

Attention is called to the simplicity of the apparatus, which enables it to be manufactured to sell at low cost, and to the ease with which the film can be threaded, as it is simply necessary to lift the movable gate section 43, place the film between the movable and fixed gate sections allowing them to hold the film therebetween, and attach the film to the take-up reel.

When the shutter is removed and replaced, there is no danger of getting the cam out of its proper relation with the shaft, as the pin 24 must be placed in the hole 25 before the parts can be assembled.

A starting mark $a$ is placed on the record and a starting mark $b$ is placed on the film, whereby if the stylus of the reproducer is set at $a$ and with the mark $b$ on the film framed in the aperture, the picture and the sound will be in synchronism when the machine is run. The socket 42' for the lamp is preferably frictionally held in the bottom of the lamp housing so that the lamp can be adjusted in the lamp housing to cause the rays of light properly to pass through the apertures and lens system. The spring belt 50 will readily slip when the film is not moving so that the lower or take-up reel is not turned when the film is not being moved by its feeding means. A detachable handle 61 is provided for the shaft of the upper or delivery reel so that said upper reel can be turned to re-wind the film thereon.

A spring 62 is attached to the lamp housing and bears against the movable gate section or door 43. This spring cooperating with the spring 45, holds the movable gate section against the fixed gate section 33 and also tends frictionally to hold the lamp housing on the studs.

From the foregoing description the advantages and novel features of the invention will be readily apparent to those skilled in the art.

It is to be understood that changes may be made in the construction and in the combination and arrangement of the several parts, provided that such changes fall within the scope of the appended claims.

What we claim is:—

1. In cinematographic apparatus, in combination, a support, a relatively fixed gate member extending from said support and carried thereby, film supporting means carried by said support, a relatively movable gate member, resilient means for pressing said movable gate member toward said other gate member for holding thereagainst a film supported by said film supporting means, mechanism for intermittently moving the film between said gate members and in relation to the mass of film upon said supporting means, and shock absorbers extending from the ends of said gate and adapted to contact with the film between said ends of the gate and said film supporting means.

2. In a projecting device, in combination, a continuously moving film support, a casing, a film gate mounted in operative relation to said casing and extending laterally therefrom comprising relatively rigid members between which a film passes, one of said members constituting a film gate plate and the other of said members constituting a pressure plate adapted directly to engage and hold the film in position, means for intermittently moving the film from said film support, and a spring member rigidly connected to one of said gate members and projecting therefrom and yieldingly engaging the film in advance of said gate, said spring member serving to compensate for the difference in character of movement of said continuous support and said intermittent moving means.

3. In a projecting device, in combination, a continuously moving film support, a casing, a film gate mounted in operative relation to said casing and extending laterally therefrom comprising relatively rigid members between which a film passes, one of said members constituting a film gate plate and the other of said members constituting a pressure plate adapted directly to engage and hold the film in position, means for intermittently moving the film toward said film support, and a spring member rigidly connected to one of said members and projecting therefrom and yieldingly engaging the film as it passes from said gate, said spring member serving to compensate for the difference in character of movement of said intermittent moving means and said continuous support.

4. In cinematographic apparatus, in combination, a housing, a plate constituting one side thereof, a film gate plate having a channel therein and a flange whereby said plate may be removably secured to said first plate, a door adapted to press against said gate, a pin supporting said door mounted in the flange of said gate plate, a spring between said gate plate and door tending to press the door to the plate, and shock absorber springs extending outwardly from the ends of said gate plate and adapted to make contact with a film before it enters and after it leaves the gate plate and to absorb shocks in said film during its passage through said gate when the cinematograph is in operation.

5. In cinematographic apparatus, in combination, a housing including a side plate, a lamp housing removably positioned on said plate, a detachable film gate mounted on said side plate and comprising an apertured plate and an apertured door spring pressed thereto, spring members secured to the ends of said film gate and extending outwardly therefrom, a pair of film supporting reels supported on said housing, a revolvable cam positioned in front of said gate, mechanism actuated by said cam for moving the film through said gate, a shaft for said cam supported in said housing and extending through said side plate, a shutter supported on said shaft and rotatable therewith, and a lens mounted on said side plate in line with the apertures in said film gate.

6. In cinematographic apparatus, in combination, a housing including a side plate, a film gate mounted on said side plate, outside said housing, said film gate comprising an apertured plate and an apertured door spring pressed thereto, a reciprocable claw mounted on the outside of said side plate and adapted to cooperate with said film gate, a shaft supported in said side plate, a cam on said shaft for operating said claw, an apertured shutter mounted on said shaft, and an optical system mounted on said side plate in front of said shutter.

7. In cinematographic apparatus, in combination, a housing including a side plate having mounted thereon outside said housing the following instrumentalities; a lamp housing having an aperture therein and a condensing lens in said aperture, a film gate comprised of two members one forming an apertured plate and the other a spring pressed apertured door adapted to engage said plate, said members being so positioned that the apertures therein are in alignment with the aperture in said lamp housing, a revolvable cam and means actuated thereby for moving a film through said gate, a circular apertured shutter adapted to revolve about the same axis as said cam and to intercept a light beam from said lens, and a lens system in line with said shutter aligned with said condensing lens.

8. In a film handling apparatus, a first continuously moving film support, a second continuously moving film support, an intermittent feeding member for feeding a film in relation to said supports, a gate disposed between said supports through which the film passes for cooperation with said feeding member, said gate including a fixed section and a movable section; a resilient member mounted upon said fixed gate section and having a curved portion extending toward said first film support, said curved portion providing a substantially continuous film engaging surface with said fixed section, a resilient member mounted upon the other end of said fixed gate section and having a curved portion turned toward the other of said supports, said resilient member providing a substantially continuous film engaging surface with said fixed gate section, said resilient members serving to compensate for the difference in the character of movement of said continuous supports and said intermittent member.

9. In a film handling apparatus, a continuously operating delivery member, a continuously operating taking up member, an intermittent feeding member for feeding a film in relation to said member, a gate disposed between said delivery and taking up members through which the film passes while being fed, said gate including a fixed section and a movable section, a compensating member mounted integrally with one of said gate sections and having a resilient curved portion extending toward said delivery member, said compensating member being arranged for cooperation with said gate section with which it is mounted to provide a substantially continuous film engaging and guiding surface therewith, a compensating member mounted integrally with the end of said gate section opposite from that with which said first named compensating member is mounted, said second compensating member having a resilient curved portion extending toward said take-up member, said second compensating member being arranged for cooperation with said gate section with which it is mounted to provide a substantially continuous film engaging and guiding surface therewith, said resilient curved portions serving to compensate for the difference in character of movement of said intermittent member and said continuous members.

10. In a film handling apparatus, a continuously moving film support, a gate, means for intermittently feeding a film between said gate and said support, said gate comprising two oppositely disposed parallel sections with film engaging surfaces, and a flat spring extending from one of said gate sections toward said film support and forming a substantially continuous film engaging surface with the film engaging surface of said gate section, said gate section and said support being so disposed in relation to each other that said spring engages the film therebetween in a bight therein for compensating for the difference in character of movement of said support and said intermittent feeding member.

11. In a film handling apparatus in combination, an intermittently operating feeding member and a continuously moving film support, a gate structure including an apertured member having a film engaging and guiding surface along which the film is drawn and a spring comprising a single leaf extending from said apertured member toward said continuous film support and forming a film engaging and guiding surface which is substantially continuous with that of said apertured gate member, said film guiding surfaces being so disposed in relation to said support that said spring engages the film in a bight for subjecting it to a tension which compensates for the difference in character of movement of said continuous support and said intermittently operating feeding member; and means for holding the film in operative relation to said apertured gate member during the feeding operation.

12. In a film handling apparatus, in combination, an intermittently operating feeding member and a continuously moving film support, a gate structure including an apertured member having a substantially continuous film engaging and guiding surface along which a film is drawn, the portion of said surface at one end of said apertured member being so disposed that it engages the film in a bight and being characterized by sufficient resilience to vibrate during the feeding operation in step with the movement of said intermittent feeding member for subjecting the film to compensating tension; and means for holding the film in operative relation to the aperture of said member during the feeding operation.

13. In a projecting device, a pair of supports for a film strip, a casing, a film gate secured to said casing and extending laterally therefrom comprising rigid members detachable from said device and between which the film passes, one of said members constituting a film gate plate and the other of said members constituting a hinged pressure plate adapted to directly engage and hold the film in position, and a spring member rigidly connected to one of said members and projecting therefrom and yieldably engaging said film strip in advance of said gate and adapted to absorb shocks in said film.

14. In a projection device, a pair of supports for a film strip, a casing, a film gate secured to said casing and extending laterally therefrom comprising rigid members detachable from said device and between which the film passes, one of said members constituting a film gate plate and the other of said members constituting a hinged pressure plate adapted to directly engage and hold the film in position, and a spring member rigidly connected to one of said members and projecting therefrom and yieldably engaging said strip after it passes from said gate.

15. In a film handling apparatus, an intermittently operating feeding member, a continuously moving film support, an apertured member having a substantially continuous film engaging and guiding surface along which a film is drawn, a portion of said surface spaced from the aperture and engaging the film between the aperture and said continuously moving film support being so disposed that it engages the film in a bight and being characterized by sufficient resilience to vibrate during the feeding operation in step with the movement of said intermittent feeding member for subjecting the film to a yielding tension which compensates for the difference between the intermittent movement of said feeding member and the continuous movement of said film support, and means for holding the film in operative relation to the aperture of said member.

16. In a film handling apparatus, a continuously moving film support, a film engaging guide having an aperture adapted for the passage of light, an intermittently operating feeding member for advancing a film along the surface of said guide past the aperture thereof, a continuously rotating support for the film so advanced, a film engaging guide disposed opposite to said first mentioned guide for holding the film in operative and plane relation to the aperture thereof, and a flat spring extending from one of said guides toward said film support and forming a substantially continuous film engaging surface with the film engaging surface of said guide from which it extends, said guide and said support being so disposed in relation to each other that said spring engages the film therebetween in a bight therein for compensating for the difference in character of movement of said support and said intermittent feeding member.

CLARKSON U. BUNDICK.
ARTHUR BERGLUND.